United States Patent
Lee et al.

(10) Patent No.: US 12,536,441 B2
(45) Date of Patent: Jan. 27, 2026

(54) METHOD AND SYSTEM FOR CHANGING STRUCTURE OF DEEP LEARNING MODEL BASED ON CHANGE IN INPUT RESOLUTION

(71) Applicant: NOTA, INC., Daejeon (KR)

(72) Inventors: Byeongman Lee, Daejeon (KR); Jae Woong Yun, Daejeon (KR); Minsu Kim, Daejeon (KR); Tae-Ho Kim, Daejeon (KR)

(73) Assignee: NOTA, INC., Daejeon (KR)

( * ) Notice: Subject to any disclaimer, the term of this patent is extended or adjusted under 35 U.S.C. 154(b) by 776 days.

(21) Appl. No.: 17/819,261

(22) Filed: Aug. 11, 2022

(65) Prior Publication Data
US 2023/0046448 A1    Feb. 16, 2023

(30) Foreign Application Priority Data
Aug. 12, 2021 (KR) .......................... 10-2021-0106530

(51) Int. Cl.
*G06N 3/082*    (2023.01)
*G06N 3/0464*    (2023.01)

(52) U.S. Cl.
CPC ........... *G06N 3/082* (2013.01); *G06N 3/0464* (2023.01)

(58) Field of Classification Search
CPC .............................. G06N 3/0464; G06N 3/082
See application file for complete search history.

(56) References Cited

FOREIGN PATENT DOCUMENTS

| KR | 10-2018-0073118 | 7/2018 |
|---|---|---|
| KR | 10-2020-0023238 | 3/2020 |

OTHER PUBLICATIONS

Mostafa, Sakib, et al. "Visualizing feature maps for model selection in convolutional neural networks." Proceedings of the IEEE/CVF international conference on computer vision. 2021. (Year: 2021).*
Nam, Seung-Hun, et al. "Content-aware image resizing detection using deep neural network." 2019 IEEE International Conference on Image Processing (ICIP). IEEE, 2019. (Year: 2019).*
Jiang, Yu-Gang, et al. "Learning layer-skippable inference network." IEEE Transactions on Image Processing 29 (2020): 8747-8759 . (Year: 2020).*
Korean Office Action corresponding to Korean patent application No. 10-2021-0106530, mailed Feb. 3, 2023, (no english version available).
Yichen Zhu et al., Resizable Neural Networks. ICLR 2020 Conference Blind Submission, 1-14 pages 'Apr. 30, 2020).

* cited by examiner

*Primary Examiner* — Eric Nilsson
(74) *Attorney, Agent, or Firm* — Christensen O'Connor Johnson Kindness PLLC

(57) ABSTRACT

Disclosed are a method and system for changing a structure of a deep learning model based on a change in resolution of input data. The method of changing a structure of a deep learning model may include generating, by the at least one processor, a plurality of input data having different resolution by performing various resolution changes on input data having given resolution, performing, by the at least one processor, inference on each of the plurality of generated input data through a deep learning model, checking, by the at least one processor, the size of a feature map output by each of layers included in the deep learning model while the inference is performed, and changing, by the at least one processor, the structure of at least one of the layers based on the checked size of the feature map.

11 Claims, 6 Drawing Sheets

FIG. 6

| Name | Acc(%) | Time(ms) | # of Param | Flops | Size(Mbytes) |
|---|---|---|---|---|---|
| EfficientNetB0 (the existing) | 83.003 | 30.101 | 4,062,374 | 17,585,908 | 16.878 |
| EfficientNetB0 (1x1 removal) | 84.495(+1.492) | 17.581(1.71×) | 952,657(4.26×) | 11,350,844(1.54×) | 4.251(3.97×) |
| EfficientNetB0 (64×64 RR) | 89.303(+6.3) | 84.882(0.35×) | 4,062,374 | 17,585,908 | 16.878 |
| | | | | | |
| MobileNetV2 (the existing) | 80.849 | 5.622 | 2,257,984 | 12,630,524 | 9.551 |
| MobileNetV2 (1x1 removal) | 82.262(+1.413) | 2.896(1.94×) | 622,026(3.63×) | 9,333,692(1.35×) | 2.851(3.35×) |
| MobileNetV2 (64×64 RR) | 87.6(+6.751) | 12.65(0.44×) | 2,257,984 | 12,630,524 | 9.551 |
| | | | | | |
| ResNet34 (the existing) | 83.634 | 50.978 | 21,302,473 | 150,326,350 | 85.613 |
| ResNet34 (1x1 removal) | 83.964(+0.33) | 25.162(2.02×) | 8,185,555(2.6×) | 124,081,230(1.21×) | 33.062(2.58×) |
| ResNet34 (64×64 RR) | 90.775(+7.141) | 110.714(0.46×) | 21,302,473 | 150,326,350 | 85.613 |

METHOD AND SYSTEM FOR CHANGING STRUCTURE OF DEEP LEARNING MODEL BASED ON CHANGE IN INPUT RESOLUTION

CROSS-REFERENCES TO RELATED APPLICATIONS

This application is based on and claims priority under 35 U.S.C. 119 to Korean Patent Application No. 10-2021-0106530, filed on Aug. 12, 2021, in the Korean intellectual property office, the disclosures of which are herein incorporated by reference in their entireties.

TECHNICAL FIELD

The following description relates to a method and system for changing a structure of a deep learning model based on a change in resolution of input data.

BACKGROUND OF THE DISCLOSURE

The weight-lightening of a deep learning model (or an AI model) means a function, module and/or a function for making a given deep learning model a smaller deep learning model. In this case, the term "small" may mean that the number of weights (or bias) constituting the deep learning model is reduced, the capacity of the deep learning model is reduced, or an inference speed is made faster. In this case, it is important to not degrade performance of the deep learning model while performing the weight-lightening of the deep learning model.

A weight-lightening scheme includes various types. The weight-lightening scheme may basically include pruning, quantization, knowledge distillation, model search (or neural architecture search), and filter decomposition. Each of the weight-lightening schemes may include various types of weight-lightening schemes.

In addition, a resolution change is used as a method capable of achieving the weight-lightening of the deep learning model. The resolution change is a technology that may be applied to models which may handle various input sizes, such as a convolutional neural network (CNN), among deep learning models, and means a task for changing resolution of input data. A change in the resolution helps to reduce a computational load and a memory footprint because the number of operations itself performed in a convolution operation in the CNN is reduced.

Prior Art Document Number

Korean Patent Application Publication No. 10-2020-0023238

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure provide a method and system for changing a structure of a deep learning model, which can improve performance of a deep learning model by changing the structure of a layer included in the deep learning model based on the size of the feature map that is output by each layer of the deep learning model.

In an embodiment, a method of changing a structure of a deep learning model, which is performed by a computer device including at least one processor, includes generating, by the at least one processor, a plurality of input data having different resolution by performing various resolution changes on input data having given resolution, performing, by the at least one processor, inference on each of the plurality of generated input data through the deep learning model, checking, by the at least one processor, the size of a feature map output by each of layers included in the deep learning model while the inference is performed, and changing, by the at least one processor, the structure of the deep learning model by removing at least one of the layers based on the checked size of the feature map.

According to an aspect, the checked size of the feature map corresponding to the removed at least one of the layers may be 1×1.

According to another aspect, generating the input data may include generating the plurality of input data having different resolution smaller than the given resolution.

According to still another aspect, the deep learning model may be a model trained by learning data having the given resolution.

According to still another aspect, the deep learning model may include a convolutional neural network (CNN).

According to still another aspect, the method may further include generating output data using the deep learning model with the changed structure based on the input data.

According to still another aspect, the method may further include changing, by the at least one processor, a structure of at least one layer among the layers based on the checked size of the feature map so that the resolution of the feature map output by the at least one layer is changed.

According to still another aspect, changing the structure of at least one of the layers may include changing the structure of the at least one layer so that the at least one layer among layers that output 1×1 size feature map outputs a feature map having a size larger than 1×1.

According to still another aspect, changing the structure of at least one of the layers may include adjusting a stride as a value of a pixel moving at a time through a sliding window by a kernel.

According to still another aspect, changing the structure of at least one of the layers comprises adjusting a padding added to an input tensor to increase the resolution of the input tensor.

There is provided a computer-readable recording medium on which a program for executing the method in a computer device is recorded.

In an embodiment, there is provided a computer device including at least one processor implemented to execute an instruction readable by a computer device. The at least one processor generates a plurality of input data having different resolution by performing various resolution changes on input data having given resolution, performs inference on each of the plurality of generated input data through a deep learning model, checks the size of a feature map output by each of layers included in the deep learning model while the inference is performed, and changes the structure of at least one of the layers based on the checked size of the feature map.

Performance of a deep learning model can be improved by changing the structure of a layer included in the deep learning model based on the size of a feature map that is output by each layer of the deep learning model.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 6 is a diagram illustrating an example of performance of a deep learning model according to an embodiment of the present disclosure.

DETAILED DESCRIPTION

While illustrative embodiments have been illustrated and described, it will be appreciated that various changes can be made therein without departing from the spirit and scope of the disclosure.

Hereinafter, embodiments are described in detail with reference to the accompanying drawings.

A system for changing a structure of a deep learning model according to embodiments of the present disclosure may be implemented by at least one computer device. In this case, a computer program according to an embodiment of the present disclosure may be installed and driven in the computer device. The computer device may perform a method of changing a structure of a deep learning model according to embodiments of the present disclosure under the control of the driven computer program. The computer program may be stored in a computer-readable recording medium that is connected to the computer device in order to execute the method of changing a structure of a deep learning model in a computer.

Figure 1:
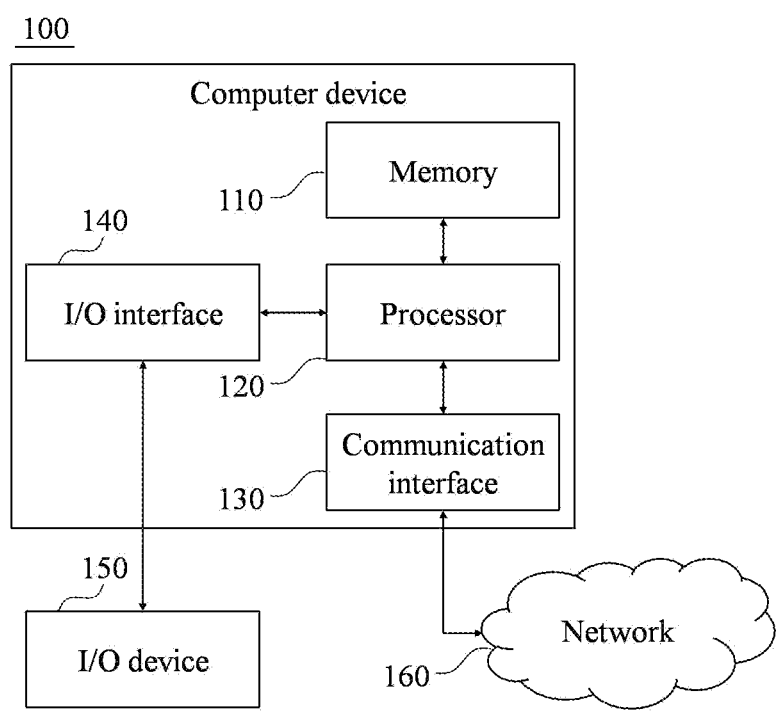
FIG. 1 is a block diagram illustrating an example of a computer device according to an embodiment of the present disclosure.

FIG. 1 is a block diagram illustrating an example of a computer device according to an embodiment of the present disclosure. As illustrated in FIG. 1, the computer device 100 may include a memory 110, a processor 120, a communication interface 130, and an input/output (I/O) interface 140. The memory 110 is a computer-readable recording medium, and may include permanent mass storage devices, such as random access memory (RAM), read only memory (ROM), and a disk drive. In this case, the permanent mass storage device, such as ROM and a disk drive, may be included in the computer device 100 as a permanent storage device separated from the memory 110. Furthermore, an operating system and at least one program code may be stored in the memory 110. Such software components may be loaded onto the memory 110 from a computer-readable recording medium separated from the memory 110. Such a separate computer-readable recording medium may include computer-readable recording media, such as a floppy drive, a disk, a tape, a DVD/CD-ROM drive, and a memory card. In another embodiment, software components may be loaded onto the memory 110 through the communication interface 130 not a computer-readable recording medium. For example, the software components may be loaded onto the memory 110 of the computer device 100 based on a computer program installed by files received over a network 160.

The processor 120 may be configured to process instructions of a computer program by performing basic arithmetic, logic and input/output (I/O) operations. The instructions may be provided to the processor 120 by the memory 110 or the communication interface 130. For example, the processor 120 may be configured to execute received instructions based on a program code stored in a recording device, such as the memory 110.

The communication interface 130 may provide a function for enabling the computer device 100 to communicate with other devices over the network 160. For example, a request, a command, data or a file generated by the processor 120 of the computer device 100 based on a program code stored in a recording device, such as the memory 110, may be provided to other devices over the network 160 under the control of the communication interface 130. Inversely, a signal, a command, data or a file from another device may be received by the computer device 100 through the communication interface 130 of the computer device 100 over the network 160. A signal, a command or a file received through the communication interface 130 may be transmitted to the processor 120 or the memory 110. A file received through the communication interface 130 may be stored in a storage device (e.g., the aforementioned permanent storage device) which may be further included in the computer device 100.

The I/O interface 140 may be means for an interface with an I/O device 150. For example, the input device may include a device, such as a microphone, a keyboard, or a mouse. The output device may include a device, such as a display or a speaker. Furthermore, for example, the I/O interface 140 may be means for an interface with a device in which functions for input and output have been integrated into one, such as a touch screen. The I/O device 150, together with the computer device 100, may be configured as a single device.

Furthermore, in other embodiments, the computer device 100 may include components greater or smaller than the components of FIG. 1. However, it is not necessary to clearly illustrate most of conventional components. For example, the computer device 100 may be implemented to include at least some of the I/O devices 150 or may further include other components, such as a transceiver and a database.

Figure 2:
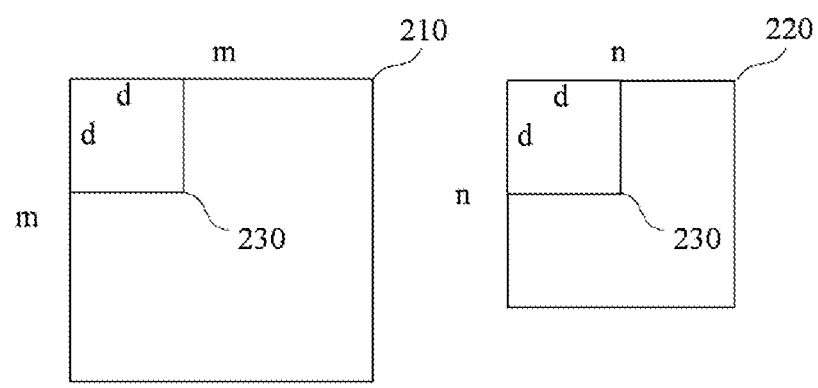
FIG. 2 is a diagram illustrating an example of a reduction in the number of convolution operations according to a resolution change.

FIG. 2 is a diagram illustrating an example of a reduction in the number of convolution operations according to a resolution change. FIG. 2 illustrates data 210 having m×m resolution and data 220 having n×n resolution. In other words, FIG. 2 illustrates an example in which the number of convolution operations is reduced as the resolution of the input data 210 having the m×m size is changed into that having the n×n size in a convolutional neural network (CNN). In this case, it is assumed that n is a natural number smaller than m. Assuming that a convolution kernel (or convolution mask) 230 is a d×d matrix, the number of convolution operations is "d×d×m×m" in the case of the data 210 having the m×m resolution, whereas the number of convolution operations is "d×d×n×n" in the case of the data 220 having the n×n resolution. In this case, since it is assumed that n is a natural number smaller than m, the number of convolution operations is reduced, so that a computational load and a memory footprint are reduced.

However, if resolution of input data is reduced, this may mean that resolution of a higher layer is reduced in terms of the structure of a deep learning model. In other words, if the resolution of the input is reduced too much, the amount of information lost may be increased because the size of a feature map of the higher layer becomes too small. If the size of the feature map becomes 1, a layer that receives an input the size of a feature map of which is 1×1 may not have a great influence on performance of the CNN although the layer is not present.

Figure 3:
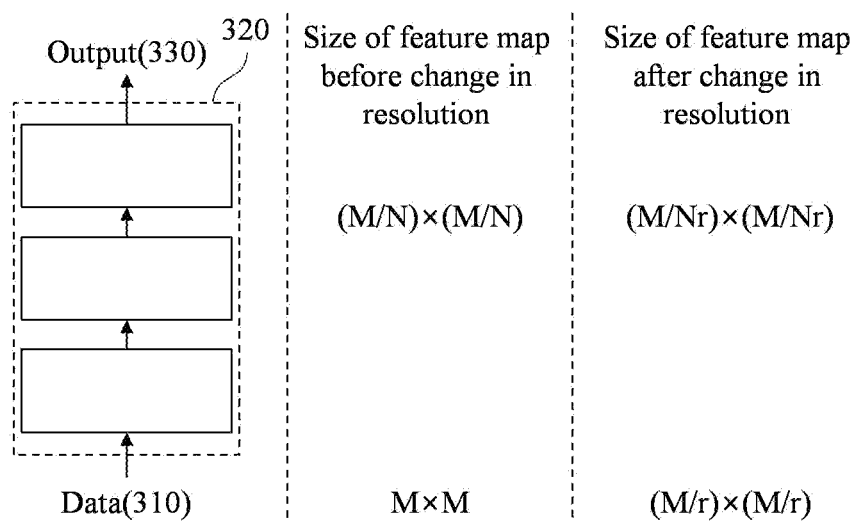
FIG. 3 is a diagram illustrating an example of the sizes of feature maps before a resolution change and after the resolution change.

FIG. 3 is a diagram illustrating an example of the sizes of feature maps before a resolution change and after the resolution change. FIG. 3 illustrates that in generating an output 330 by inputting data 310 to a deep learning model 320 including a plurality of layers, the size of a feature map is (M/N)×(M/N) with respect to the data 310 having M×M resolution before a resolution change, whereas the size of the feature map becomes (M/Nr)×(M/Nr) with respect to the data 310 having (M/r)×(M/r) resolution after the resolution change. In this case, when M is smaller than Nr, the size of the feature map becomes 1×1. A layer having such a feature map having a 1×1 size consumes only a computational load and a memory footprint while not greatly influencing performance of the deep learning model 320.

The system for changing a structure of a deep learning model according to embodiments of the present disclosure can improve performance of a deep learning model in a way to change the structure of a layer that uses, as an output, a feature map having a 1×1 size by outputting the size of a feature map, that is, the output of each layer, when the deep learning model is inferred.

Figure 4:
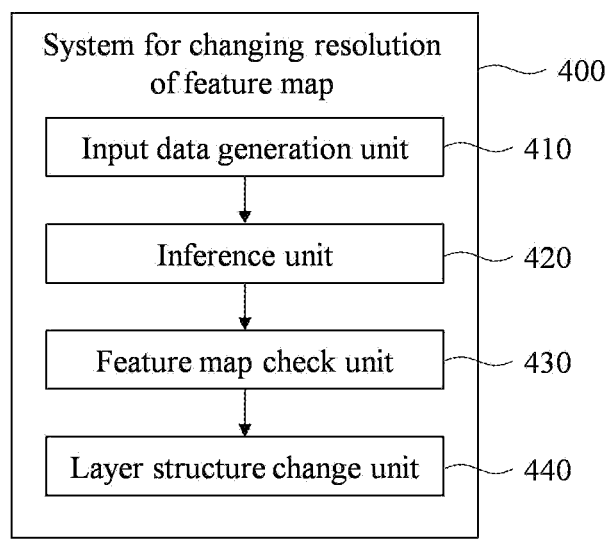
FIG. 4 is a block diagram illustrating an example of internal components of a system for changing a structure of a deep learning model according to an embodiment of the present disclosure.
Figure 5:
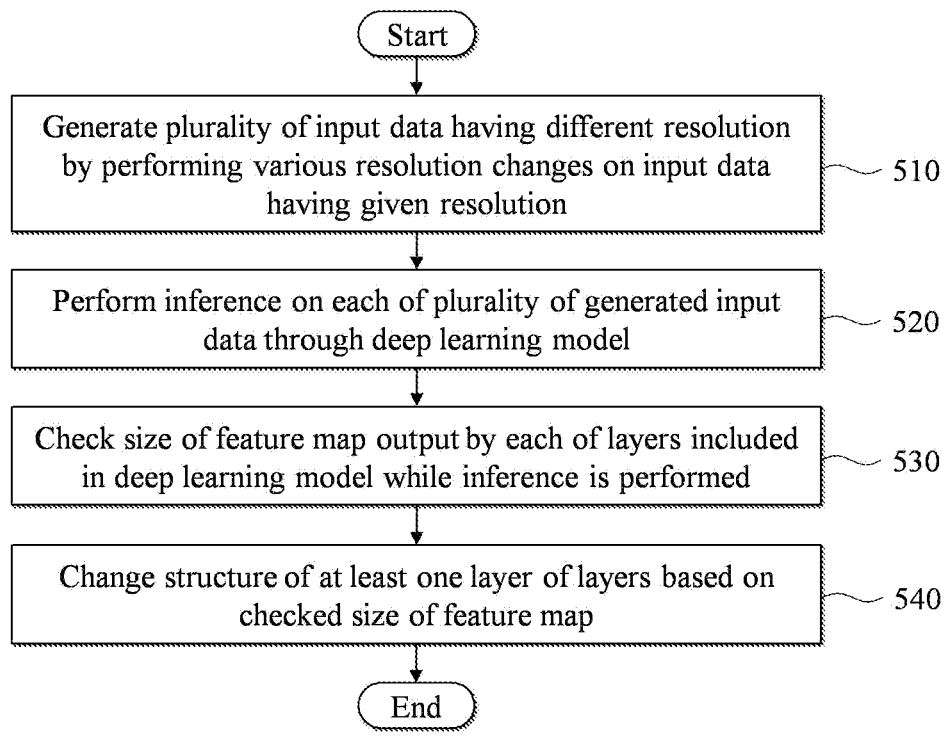
FIG. 5 is a flowchart illustrating an example of a method of changing a structure of a deep learning model according to an embodiment of the present disclosure.

FIG. 4 is a block diagram illustrating an example of internal components of the system for changing a structure of a deep learning model according to an embodiment of the present disclosure. FIG. 5 is a flowchart illustrating an example of a method of changing a structure of a deep learning model according to an embodiment of the present disclosure. The system 400 for changing a structure of a deep learning model according to the present embodiment may be implemented by the at least one computer device 100. The system 400 for changing a structure of a deep learning model in FIG. 4 may include an input data generation unit 410, an inference unit 420, a feature map check unit 430, and a layer structure change unit 440. In this case, the input data generation unit 410, the inference unit 420, the feature map check unit 430, and the layer structure change unit 440 may be functional expressions of a function of the processor 120 of the computer device 100 that implements the system 400 for changing a structure of a deep learning model, which operates under the control of a computer program. For example, the processor 120 of the computer device 100 may be implemented to execute a control instruction according to a code of an operating system or a code of at least one computer program that is included in the memory 110. In this case, the processor 120 may control the computer device 100 so that the computer device 100 performs steps 510 to 540 that are included in the method of FIG. 5 in response to a control instruction provided by a code stored in the computer device 100. In this case, the input data generation unit 410, the inference unit 420, the feature map check unit 430, and the layer structure change unit 440 may be used as functional expressions of the processor 120 for performing steps 510 to 540.

In step 510, the input data generation unit 410 may generate a plurality of input data having different resolution by performing various resolution changes on input data having given resolution. In this case, the input data generation unit 410 may generate the plurality of input data having the different resolution smaller than the given resolution. For example, when given resolution is 224×224, the input data generation unit 410 may generate a plurality of input data having different resolution, such as input data having 112×112 resolution and input data having 56×56 resolution.

In step 520, the inference unit 420 may perform inference on each of the plurality of generated input data through a deep learning model. In this case, the deep learning model may be a model that has been trained by learning data having the given resolution. In the previous example, when the given resolution is 224×224, the deep learning model may be a model that has been trained by learning data having 224×224 resolution. Such a deep learning model may be a model capable of processing various inferences although the size of an input is different as in a CNN.

In step 530, the feature map check unit 430 may check the size of a feature map that is output by each of layers included in the deep learning model while the inference is performed. As described above, the size of the feature map output by each of the layers may be different depending on resolution of input data. The smaller resolution of input data, the smaller the size of a feature map.

In step 540, the layer structure change unit 440 may change the structure of at least one layer of the layers based on the checked size of the feature map.

As an embodiment, the layer structure change unit 440 may change the structure of at least one layer of the layers by removing, from the deep learning model, a layer the checked size of the feature map of which is 1×1. As already described above, the layer the size of the feature map of which is 1×1 may consume a computational load and a memory footprint while not influencing performance of the deep learning model. Accordingly, the layer structure change unit 440 can improve performance of the deep learning model using a weight-lightening scheme for a resolution change by removing, from the deep learning model, the layer the checked size of the feature map of which is 1×1.

Furthermore, for example, the layer structure change unit 440 may change the structure of the layer the checked size of the feature map of which is 1×1 so that the corresponding layer outputs a feature map having resolution greater than 1×1. For example, the layer structure change unit 440 may change the structure of the corresponding layer so that the corresponding layer outputs a feature map having resolution greater than 1×1 by adjusting the stride and padding of the corresponding layer. In this case, the stride may be a value indicating how many pixels a kernel moves once through a sliding window. The padding may be added to the outskirt of an input tensor, and may play a role to increase resolution of the tensor. For example, the padding may increase resolution of the input tensor by adding values of 0 to the outskirt of the input tensor. As a more detailed example, the layer structure change unit 440 may change the structure of a layer a checked size of a feature map of which is 1×1 by adding values of 0 to the outskirt of an input tensor through padding so that resolution of the input tensor is increased, and thus the corresponding layer may output a feature map having resolution greater than 1×1. Furthermore, for example, the layer structure change unit 440 may change the structure of a corresponding layer so that the stride of the corresponding layer, that is, a value of a pixel that moves once through a sliding window, is reduced, and thus the corresponding layer may output a feature map having resolution greater than 1×1.

The system 400 may generate output data using the deep learning model with the changed structure based on the input data.

FIG. 6 is a diagram illustrating an example of performance of a deep learning model according to an embodiment of the present disclosure. In the table of FIG. 6, "Name" may mean the name of a deep learning model. In this case, "(the existing)" may mean a deep learning model in which the structure of a layer a checked size of a feature map of which is 1×1 is not changed. "(1×1 removal)" may mean a deep learning model in which a layer a checked size of a feature map of which is 1×1 was removed. "(64×64 RR)" may mean a deep learning model in which the structure of a layer a checked size of a feature map of which is 1×1 has been changed so that the layer outputs a feature map having a 64×64 size. Furthermore, in the table of FIG. 6, "Acc (%)" may mean inference accuracy of the deep learning model. "Time (ms)" may mean an inference time of the deep learning model. Furthermore, in the table of FIG. 6, "# of Param" may mean the number of parameters of the deep learning model. "Flops" may mean a floating-point operations per second (FLOPS) as a unit indicating the operating speed of a computer like the number of floating point operations which may be performed per second. Furthermore, in the table of FIG. 6, "Size (Mbytes)" may mean the size of the deep learning model.

From the table of FIG. 6, it may be seen that all the deep learning models in each of which the layer the checked size of the feature map of which is 1×1 has been removed have increased accuracy and operation speeds (Flops) and have reduced inference times and the reduced numbers of parameters, and reduced sizes. It may be seen that the deep learning model in which the structure of a layer has been changed so that the layer outputs a feature map having a 64×64 size has accuracy greatly increased, and also has an inference time increased.

As described above, according to the embodiments of the present disclosure, performance of a deep learning model can be improved by changing the structure of a layer included in the deep learning model based on the size of a feature map that is output by each layer of the deep learning model.

The aforementioned system or device may be implemented as a hardware component or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable medium. The computer-readable recording medium may include a program instruction, a data file, and a data structure solely or in combination. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the disclosure in which an exclusive property or privilege is claimed are defined as follows:

1. A method of changing a structure of a deep learning model, which is performed by a computer device comprising at least one processor, the method comprising:
   generating, by the at least one processor, a plurality of input data having different resolution, respectively, by performing various resolution changes on input data having given resolution, the different resolution being smaller than the given resolution;
   performing, by the at least one processor, inference on each of the plurality of generated input data through the deep learning model;

identifying, by the at least one processor, a layer that outputs a feature map having a size equal to or less than a predetermined size among a plurality of layers included in the deep learning model while the inference is performed based on the plurality of generated input data; and removing, by the at least one processor, the identified layer from the deep learning model or modifying a structure of the identified layer such that the identified layer outputs a feature map larger than the predetermined size to change the structure of the deep learning model.

2. The method of claim 1, wherein the predetermined size of the feature map output by the identified layer is 1×1.

3. The method of claim 1, wherein the deep learning model is a model trained by learning data having the given resolution.

4. The method of claim 1, wherein the deep learning model comprises a convolutional neural network (CNN).

5. The method of claim 1, further comprising:
generating output data using the deep learning model with the changed structure based on the input data.

6. The method of claim 1, wherein the modifying of the structure of the identified layer comprises adjusting a parameter of the identified layer associated with at least one of a stride or a padding of the identified layer.

7. A non-transitory computer-readable recording medium on which a program for executing the method according to claim 1 in a computer device is recorded.

8. A computer device comprising at least one processor implemented to execute an instruction readable by a computer device,
wherein the at least one processor is configured to:
generate a plurality of input data having different resolution, respectively, by performing various resolution changes on input data having given resolution, the different resolution being smaller than the given resolution, perform inference on each of the plurality of generated input data through a deep learning model, identify a layer that outputs a feature map having a size equal to or less than a predetermined size among a plurality of layers included in the deep learning model while the inference is performed based on the plurality of generated input data, and remove the identified layer from the deep learning model or modify a structure of the identified layer such that the identified layer outputs a feature map larger than the predetermined size to change a structure of the deep learning model.

9. The computer device of claim 8, wherein the predetermined size of the feature map output by the identified layer is 1×1.

10. The computer device of claim 8, wherein the deep learning model is a model trained by learning data having a given resolution.

11. The computer device of claim 8, wherein the at least one processor is configured to modify the structure of the identified layer by adjusting a parameter of the identified layer associated with at least one of a stride or a padding of the identified layer.

* * * * *